United States Patent [19]
Carstens et al.

[11] Patent Number: 5,900,321
[45] Date of Patent: May 4, 1999

[54] METHOD FOR THE PRODUCTION OF COMPOSITES

[75] Inventors: Pieter A. B. Carstens, Pretoria; Georges A. B .M. G. Boyazis, Sandton; Jennifer A. De Beer, Centurion, all of South Africa

[73] Assignee: Pelindaba District Brits Atomic Energy Corp. of South Africa Limited, South Africa

[21] Appl. No.: 08/750,682

[22] PCT Filed: Jun. 16, 1995

[86] PCT No.: PCT/US95/07635

§ 371 Date: Dec. 16, 1996

§ 102(e) Date: Dec. 16, 1996

[87] PCT Pub. No.: WO95/35341

PCT Pub. Date: Dec. 28, 1995

[30] Foreign Application Priority Data

Jun. 17, 1994 [ZA] South Africa .......................... 94/4341

[51] Int. Cl.[6] .................................................. B32B 15/04
[52] U.S. Cl. .......................... 428/457; 156/60; 427/403; 427/407.1; 427/409; 427/412.3; 428/689; 428/703
[58] Field of Search ............................. 427/322, 412.3, 427/255.3, 403, 407.1, 409; 156/60; 48/457, 689, 703

[56] References Cited

U.S. PATENT DOCUMENTS

| 3,647,613 | 3/1972 | Scotland | 161/165 |
| 3,862,284 | 1/1975 | Dixon | 264/83 |

(List continued on next page.)

FOREIGN PATENT DOCUMENTS

| 788973 | 7/1963 | Canada . |
| 0214635 | 10/1987 | European Pat. Off. . |
| 2412025 | 9/1974 | Germany . |
| 4006809 | 9/1991 | Germany . |
| 5329342 | 6/1985 | Japan . |
| 6270028 | 3/1987 | Japan . |
| 7402899 | 10/1974 | Netherlands . |
| 85/9500 | 12/1985 | South Africa . |
| 87/8240 | 11/1987 | South Africa . |

(List continued on next page.)

OTHER PUBLICATIONS

English Abstract JP 5329342 (no date).
Hopkins, J. et al. "Equilibrium Glow Discharge . . . "J. Phys. Chem. 1995, 99, 4261 (no month avail.).
Bogrou, V.B. et al. "Fracture resistance of Anticorrosion . . . " Journal (Abstract) (1 Sheet) Jun. 26, 1978, Columbus, Ohio, U.S. Abstract#192854 vol. 23, 1977 (no month avail.).
Abstract GB 2206532 Related WPI Accession(s) : 86–171348 Dec. 20, 1985.
Derwent Abstract of JP 6270028 of Mar. 1987.
Chemical Abstracts, vol. 88, No. 26, Jun. 26, 1978, Columbus, Ohio, US; abstract No. 192854.
Bobrov, V.B., et al. 'Fracture resistance . . . ' TR. Nauchnoissled. Inst. Betona Zhelezobetona, vol. 23, 1977, pp. 132–139.

*Primary Examiner*—Bernard Pianalto
*Attorney, Agent, or Firm*—Ladas & Parry

[57] ABSTRACT

The invention provides a method of producing a composite material. The method comprises subjecting a surface of a polyolefin component comprising a polyolefin material to surface activation thereof, followed by the step of adhesively securing together the polyolefin component and a substrate component. The substrate component is selected from cementitious components and metal components, and the securing takes place at the activated surface of the polyolefin component. The invention also extends to a composite material comprising a polyolefin component and a substrate component adhesively secured together. The substrate component is selected from cementitious components and metal components. The components are secured together at a surface of the polyolefin component which is activated.

14 Claims, 3 Drawing Sheets

U.S. PATENT DOCUMENTS

| | | | |
|---|---|---|---|
| 3,865,615 | 2/1975 | Manly | 117/47 |
| 4,020,223 | 4/1977 | Dixon | 428/224 |
| 4,081,574 | 3/1978 | Hawkins | 427/237 |
| 4,142,032 | 2/1979 | D'Angelo | 526/43 |
| 4,237,156 | 12/1980 | Boultinghouse | 427/255 |
| 4,264,750 | 4/1981 | Anand | 525/356 |
| 4,296,151 | 10/1981 | Boultinghouse | 427/255.1 |
| 4,404,256 | 9/1983 | Anand | 428/409 |
| 4,508,781 | 4/1985 | Yagi | 428/409 |
| 4,536,266 | 8/1985 | Bliefert | 204/159.18 |
| 4,557,945 | 12/1985 | Yagi | 427/40 |
| 4,743,419 | 5/1988 | Bieschenk | 264/83 |
| 4,764,405 | 8/1988 | Bauman | 428/35 |
| 4,818,619 | 4/1989 | Strepparola | 428/421 |
| 4,869,859 | 9/1989 | Eschwey | 264/83 |
| 4,880,879 | 11/1989 | Bauman | 525/130 |
| 5,021,297 | 6/1991 | Rhue et al. | 428/430 |
| 5,073,175 | 12/1991 | Anand | 55/16 |
| 5,275,882 | 1/1994 | Conley | 428/336 |

FOREIGN PATENT DOCUMENTS

| | | |
|---|---|---|
| 1465072 | 2/1973 | United Kingdom . |
| 1350577 | 4/1974 | United Kingdom . |
| 1465072 | 2/1977 | United Kingdom . |
| 2206532 | 12/1985 | United Kingdom . |
| 2168927 | 7/1986 | United Kingdom . |
| 1024996 | 4/1996 | United Kingdom . |

METHOD FOR THE PRODUCTION OF COMPOSITES

This invention relates to a method of producing a composite material In particular, it relates to a method of producing such composite materials for making structures and/or artifacts wherein a substrate is protected against corrosion and/or permeation of fluids by a surface cladding. It also relates to a method of producing such composite materials wherein one component is strengthened or reinforced by another component. The invention also relates to such composite materials, particularly when produced by means of said method.

According to the invention, there a provided a method of producing a composite material, the method comprising:

subjecting a surface of a polyolefin component comprising a polyolefin material to surface activation thereof; and adhesively securing together the polyolefin component and a substrate component selected from cementitious components and metal components, at the activated surface of the polyolefin component, the activation being by surface oxyfluorination activation by exposing the polyolefin component to an oxyfluorination gas mixture at a pressure of 1–500 kPa and at a temperature above 0° C. and below the melting point of the polyolefin material of the poyolefin component.

By surface activation is meant that the surface of the polyolefin component is brought into contact with a fluid in a fashion whereby atoms, molecules and/or radicals derived from the fluid are incorporated into the surface of the polyolefin component.

The polyolefin component may act to protect the substrate component, the polyolefin component forming a surface cladding for the substrate component. The polyolefin surface cladding may protect the substrate component against corrosion. The polyolefin surface cladding may instead or in addition protect the substrate component against permeation of fluids, particular when the latter is cementitious.

The oxyfluorinating gas mixture may comprise at least 5% by volume of a fluorine-containing and at least 5% by volume of oxygen, the gas mixture being at a pressure of at least 5 kPa and at a temperature of at least 20° C. Preferably said gas mixture comprises 5–20% by volume of the fluorine-containing gas and 5–95% by volume of the oxygen, the gas mixture being at a pressure of 5–150 kPa and at a temperature of 20–100° C.

More particularly the surface activation may provide the activated polyolefin component surface with a surface tension at 20° C. of at least 40 mN/m, the polyolefin material being selected from polyethylenes, polypropylenes, copolymers of ethylene and propylene and blends of such polyolefins, such as ethylene-propylene diene monomer elastomers. The polyolefins used include unmodified or modified polyolefins, eg those modified by containing ethyl vinyl acetate as an impact modifier.

Any suitable method can be used to oxyfluorinate the surface of the polyolefin component which is oxyfluorinated before it is adhesively secured to the cementitous or metal substrate component. Any suitable fluorinating process may be used for this purpose, suitably modified to provide for oxyfluorination, for example the fluorinating processes described in U.S. Pat. Nos. 3,647,613; 3,662,284; 3,865, 615; 4,020,223; 4,081,574; 4,142,032; 4,296,151; 4,508, 781; 4,536,266; 4,557,945; 4,764,405; and 4,869,059 as well as published European Patent Application EPO 21 4 635, and South African Patents Nos. 85/9500 and 87/8240, describe techniques which can be adapted for the oxyfluorination described hereunder.

By oxyfluorination is meant that the surface is provided with fluorine and oxygen substituents, eg on $-CH_2$ and/or $-CH_3$ groups forming part of the surface The fluorinating gas mixture may be fluorine itself ($F_2$) it may be a fluorinated noble gas such as $XeF_2$; or it may be a fluorohalogen such as $ClF_3$; $BrF_5$, $IF_7$ or the like. The oxyfluorinating gas mixture will typically be one in which the fluorine-containing gas forms part of a mixture with one or more other gases, such as oxides of sulphur, oxides of nitrogen or oxides of carbon, halogens, interhalogens, nitrogen, oxygen or mixtures thereof, such as air, at least one of which other gases will contain oxygen. The proportion of the fluorine-containing in such gas mixture can vary within wide limits; the fluorine-containing gas forming eg 0, 1–99,9% by volume of said mixture, typically forming 1–30% by volume thereof, although, as indicated above, particularly preferred gas mixtures include those comprising 5–20% by volume of fluorinating gas such as $F_2$ and 5–95% by volume oxygen ($O_2$ or $O_3$)

As described in more detail hereunder, adhesively securing the activated surface of the polyolefin component to the substrate component may be effected by means of an adhesive composition comprising a thermosetting resin.

The oxyfluorination under the above process conditions will usually take place in a reactor comprising a vacuum chamber with provision for feeding thereto and withdrawal therefrom of gases, pressure control, temperature control and control of the composition of gas mixtures therein, and the process will usually be carried out batchwise.

When the polyolefin cladding component is in the form of a sheet, it may, however, be treated in a roll-to-roll process using a film fluorinator as the reactor, with similar oxyfluorination conditions to those described above with reference to the batch process. The absolute pressure in such reactor will typically be one atmosphere; ±20 kPa. The gas mixture composition may, as indicated above, be such that it has a fluorine ($F_2$) content is 5–20% by volume , the remainder being made up of other reactive gases, or inert gases, eg $N_2$. The proportion of said other gases in the mixture may be between 5 and 95% by volume, the balance being made up by an inert gas such as $N_2$.

As indicated above, the surface oxyfluorination, may be such as to provide the activated polyolefin component surface with a surface tension at 20° C. of at least 40 mN/m, preferably at least 45 mN/m.

The substrate component may be a cementitious component made of a cementitious maternal such as cement, concrete, cementitious mortar or a related cement-containing material. The cementitous substrate component may be flat, being eg a concrete wall or floor, or tubular, being eg a concrete pipe. The substrate component may instead be a metal component, such as mill steel component, and may be tubular, being eg a pipe, although it may, instead be a box or container-type structure. Accordingly, the material of the substrate component may be selected from cement, concrete, cementitious mortar or mild steel, the thermosetting resin being selected from epoxy resins and polyester resins.

The polyolefin component, when used for cladding, may be of an appropriate shape, depending on the shape of the substrate component. Thus, the polyolefin component may be a flat or curved sheet. When the substrate component is tubular, eg a pipe, the polyolefin component may be a pipe, a polyolefin pipe forming an external and/or internal cladding or lining for the cementitous or metal pipe, as the case may be.

The cladding or other polyolefin component may be of polyethylene, such as high density polyethylene (HDPE), polypropylene (PP), or copolymers of ethylene and propylene, such as ethylene-propylene-diene monomer elastomer (EPDM), modified or unmodified, as indicated above, or blends of such polyolefins.

Adhesively securing the fluorinated surface of the polyolefin cladding component to the cementitious or metal substrate component may be effected by using a suitable adhesive composition, such as a thermosetting resin as indicated above. The adhesive composition may comprise a curable settable thermosetting resin, eg an epoxy resin or polyester resin. Suitable epoxy resin-based adhesive compositions are those available in South Africa as PRO-STRUCT 121 and PRO-STRUCT 30/71 from Pro-Struct, a division of KayMac Limited. Suitable polyester resin-based adhesive compositions are a polyester resin adhesive paste available in South Africa as FREE FIX 40/6345 from NCS Resins, a division of Sentrachem Ltd, a resilient isophthalic polyester resin adhesive available in South Africa as GELCOAT 65 from said NCS Resins, and an isophthalic, non-accelerated resilient polyester resin adhesive available in South Africa as POLYLITE 8 1 30 from said NCS Resins.

The method may include the step, prior to the adhesive securing, of subjecting the activated surface of the polyolefin component to hydrolysis, to enhance the adhesion of the fluorinated surface to the adhesive composition. The hydrolysis is particularly effective when the adhesive securing step is by means of an epoxy adhesive composition. The hydrolysis may be effected by contacting the oxyfluorinated surface with water at an elevated temperature for a sufficient period of time, eg by immersing the polyolefin component in water overnight at 50° C., to hydrolyse any hydrolysable chemical groups on the fluorinated surface of the polyolefin component. Exposure of the oxyfluorinated surface to atmospheric air for extended periods of time should also result in full hydrolysis of the oxyfluorinated surface. On particular, the hydrolysis may be by contacting the activated surface of the polyolefin component with liquid water for a period of 2–6 hours.

The surface may be subjected to degreasing prior to oxyfluorination thereof and/or after fluorination and prior to the adhesive securing of the cladding component to the cementitious or metal substrate component. Accordingly, the surface may be subjected to degreasing prior to activation thereof. Furthermore, the surface may, after activation thereof and prior to the adhesive securing, be subjected to degreasing.

Suitable degreasing agents used to degrease the surface may be selected from trichloro-ethylene (TCE), acetone ethanol, methyl ethyl ketone (MEK) and xylene. Water-soluble detergents can also be used. Naturally routine experimentation will be employed to determine which degreasing agents are compatible with the surface and with the resins employed in the process of the invention.

As indicated above, the polyolefin component may be secured to the substrate component to form a surface cladding of the substrate component. Furthermore, instead, the substrate component may be secured to the polyolefin component to form a surface cladding of the polyolefin component.

Thus, instead of using the polyolefin component to protect the substrate component, the substrate component may be used for strengthening and/or reinforcing the polyolefin component. The polyolefin component in this case may be tubular or hollow cylindrical, eg circular or square in cross-section, suitable for containing and/or transporting a fluid in particular, the polyolefin component may be a pipe or pipe fitting, or a tank, the metal reinforcing component forming an external cladding or lining for the polyolefin pipe, pipe fitting or tank. Typically in this case, the polyolefin material of the polyolefin substrate component is again polyethylene, such as high density polyethylene (HDPE), polypropylene (PP), or copolymers of ethylene and propylene, such as ethylene-propylene-diene monomer elastomer (EPDM), modified or unmodified, or blends of such polyolefins. The metal strengthening or reinforcing component may be of mild steel. The surface oxyfluorination method, for activating the surface of the polyolefin substrate component before it is adhesively encapsulated or clad by the metal reinforcing component, may be similar to that described above for protection of the substrate component by the polyolefin component; and adhesively securing the reinforcing component to the polyolefin component may be effected using a similar adhesive composition as described above for protection of the substrate component by the polyolefin component. A suitable adhesive composition is an epoxy resin-based adhesive such as at available in South Africa as PRO-STRUCT 7907 A and B from Pro-Struct, a division of Kay Mac Limited. Typically, the resin may be cured by using a suitable curing agent or catalyst, eg a commercial curing system or package supplied by; and used in the appropriate amount as recommended by, the manufacturer of the particular resin used. This version of the method may also include the further step; prior to the adhesive securing, of subjecting the fluorinated surface of the polyolefin substrate component to hydrolysis, as described above, to enhance the adhesion of the oxyfluorinated surface to the adhesive composition. Plastics pipes are widely used for the transport of fluids and the pressure in such pipes may vary from below atmospheric (vacuum) up to tens of atmospheres. Polyolefin pipes and tanks can be lined or encapsulated by metal reinforcing components in accordance with the method of the invention to increase their pressure rating, and/or to increase their rigidity. Such composite pipes and tanks combine the advantages of the strength (for pressure) and rigidity of eg steel and the relative chemical and abrasion resistance of polyolefin plastics.

The inventions extends to a composite material whenever produced in accordance with the method of the invention.

The invention will now be described, by way of non-limiting illustrative example, with reference to the following Examples and with reference to the accompanying diagrammatic drawings.

Examples 1–3 illustrate the method of the invention applied to the protection of cementitous substrates by a polyolefin surface cladding. Example 4 illustrates the method of the invention applied to the strengthening of a polyolefin component by a metal reinforcing surface cladding. Example 5 illustrates the method of the invention employing various resins. Example 6 illustrates the method of the invention employing various degreasing agents. Example 7 illustrates the method of the invention employing various drying times prior to oxyfluorination. Example 8 illustrates the method of the invention employing various oxyfluorination methods. Examples 9A, 9B and 9C illustrate the method of the invention employing varying activation times. Examples 10A and 10B illustrate the method of the invention in the light of various adhesion tests and kinetics tests Examples 11A and 11B illustrate the method of the invention employing various hydrolysis media. Example 12 illustrates the method of the invention employing varying drying times after hydrolysis. Example 13 illustrates the method of the invention with regard to degreasing of substrates after activation and prior to adhesion.

EXAMIPLE 1 (Resin Choice)

The following experimental conditions were employed:

Material: Black HDPE (PE 300)

Gas Mixture: 10 kPa air, 20 kPa $F_2/N_2$ mixture comprising 20% by volume $F_2$.

Oxyfluorination Time and Temperature: 30 min at 50° C.

Surface Dimensions: length: 200 mm, width: 200 mm, thickness: 2 mm

Resins:
a) Pro-Struct 121,
b) Pro-Struct 30/71,
c) Free Fix 40/6345,
d) Gelcoat 65,
e) Polylite 8130.

The HDPE tiles (untreated and activated) were stuck to a concrete wall using the above resins by means of hand pressure. After one week a force was applied to the tiles to endeavour to peel the tiles from the wall.

The results of these adhesion tests are set out in Table 1 below.

TABLE 1

Results of adhesion tests between PE 300 and concrete using various adhesives

| Resin | Manufacturer | Type of Resin | Observation |
|---|---|---|---|
| Pro-Struct 121 | Pro-Struct | Multi-purpose Epoxy | Breakline within the Concrete |
| Pro-Struct 30/71 | Pro-Struct | Abrasion Resistant Epoxy | Breakline within the Concrete |
| FreeFix 40/6345 | NCS Resins | Filled Polyester Adhesive Paste | Adhesive Failure between Adhesive and Concrete |
| Gelcoat 65 | NCS Resins | Resilient Isophthalic Polyester Resin | Adhesive Failure between Adhesive and Concrete |
| Polylite 8130 | NCS Resins | Isophthalic, Non-accelerated, Resilient Polyester resin | Adhesive Failure between Adhesive and Concrete |

None of the untreated HDPE tiles remained stuck to the concrete wall.

The results in Table 1 indicate that epoxy resins appear to be the most suitable. Pro-Struct 30/71 (polyamido-amine curing agent) appeared to be the most suitable resin due to its cost, ease of mixing, ease of application and it removed less concrete from the wall compared to the other resins when the peel tests were conducted.

EXAMPLE 2

From the results of Example 1 it was clear that further work should be focused on the use of epoxy adhesives. The aim of the further work was to optimise the fluorination conditions for maximum adhesion between the epoxy adhesives listed in Table 1 and fluorinated polyolefin sheet.

Black pigmented HDPE strips (26×300 mm) were cut from a PE 300 sheet. The strips were placed in a stainless steel vacuum reaction vessel which was evacuated and then charged with a 10/90 $F_2/O_2$ mixture. The vessel was kept at 50° C. and the strips were fluorinated for different periods of time to provide a surface fluorine concentration of 55,4 $\mu gF/cm^2$. After the selected period of time, the fluorinating atmosphere was evacuated from the vessel and the strips removed.

The adhesive strength of PRO-STRUCT 30/71 on these strips was evaluated by T-peel tests, according to ASTM D 876-92. The only changes to the prescribed ASTM procedure were that the crosshead speed used was 200 mm/min and that the signal integration interval was 10 cm.

From the T-peel tests, it was clear that the optimum treatment time for maximum adhesion was reached within 30 minutes, using the above treatment conditions. It was also observed that a post-treatment of the fluorinated surface by hydrolysis had a material influence on the adhesion strength. It was found that the maximum adhesion strength (typically 8N/mm) was obtained when the strips were submerged in water overnight at 50° C. Strips which were glued immediately after fluorination without post-treatment by hydrolysis, or which were treated with a basic solution, eg a NaOH solution, showed relatively weak bonding to the epoxy adhesive.

The Applicant has found the Improved adhesion arising from the hydrolysis to be surprising and cannot account thereof. However, without being bound by theory, the Applicant believes that the fluorination treatment may form acyl fluoride- and carboxylic acid groups on the surface of the polyolefin component. On hydrolysis, the acyl fluoride groups may either be removed or they may be transformed into additional carboxylic acid group. These carboxylic acid groups possibly act as curing agents for the epoxy resin. A chemical bond may thus actually be formed between the adhesive and the fluorinated surface, which can lead to the high bond strength between the polyolefin component and the epoxy adhesive. This mechanism would explain why basic hydrolysis of the fluorinated surface does not enhance adhesion to the epoxy adhesive, since basic hydrolysis leads to the formation of salts on the polyolefin surface, and not to additional carboxylic acid groups.

EXAMPLE 3

Tests similar to Example 1 were carried using tiles of EPDM instead of HDPE. In control tests, tiles which were not fluorinated showed no adhesion to the concrete wall using PRO-STRUCT 30/71 as adhesive. When the tiles were fluorinated as in Example 1, adhesion was so strong that breakline within the elastomer was observed.

EXAMPLE 4

Push out tests were done on a PP pipe which was provided with an external lining/cladding of a mild steel pipe by the method according to the invention. The PP pipe was 90 mm OD class 4 pipe having a wall thickness of 5 mm. The PP was available from Megapipe, a division of Mega Plastics, which is in turn a division of Sentrachem Limited. The outer surface of the PP was fluorinated in a manner to that described in Example 1, using the same fluorination conditions. After fluorination, the PP pipe was inserted into a pipe of mild steel. The outside diameter of the PP pipe was 1 mm smaller that the inside diameter of the steel pipe. At each end of the steel pipe, a cup flange was bolted, each cup flange incorporating a spacer to keep the steel pipe and the PP pipe apart and also nozzles to allow both adhesive to be injected and air to escape. This technique is known as crack injection. The PP pipe and the steel pipe were then suspended at about ±60° and an epoxy-containing adhesive composition available as PRO-STRUCT 7907 A and B from Pro-Struct, was then infected into the bottom cup flange under pressure, from a pressure pot where the adhesive composition was also premixed. Curing of the epoxy adhesive was by means of a curing agent package supplied by, and used in an amount as recommended by, the manufacturer of PRO-STRUCT 7907 A and B. The epoxy adhesive was allowed to partially cure after which the cups were removed and the composite pipe allowed to stand until full cure was achieved.

The composite pipe was cut into 60 mm lens to form samples numbered as follows:

| 1 | 2 | 3 | 4 | 5 | 6 |
|---|---|---|---|---|---|

Figure 1:
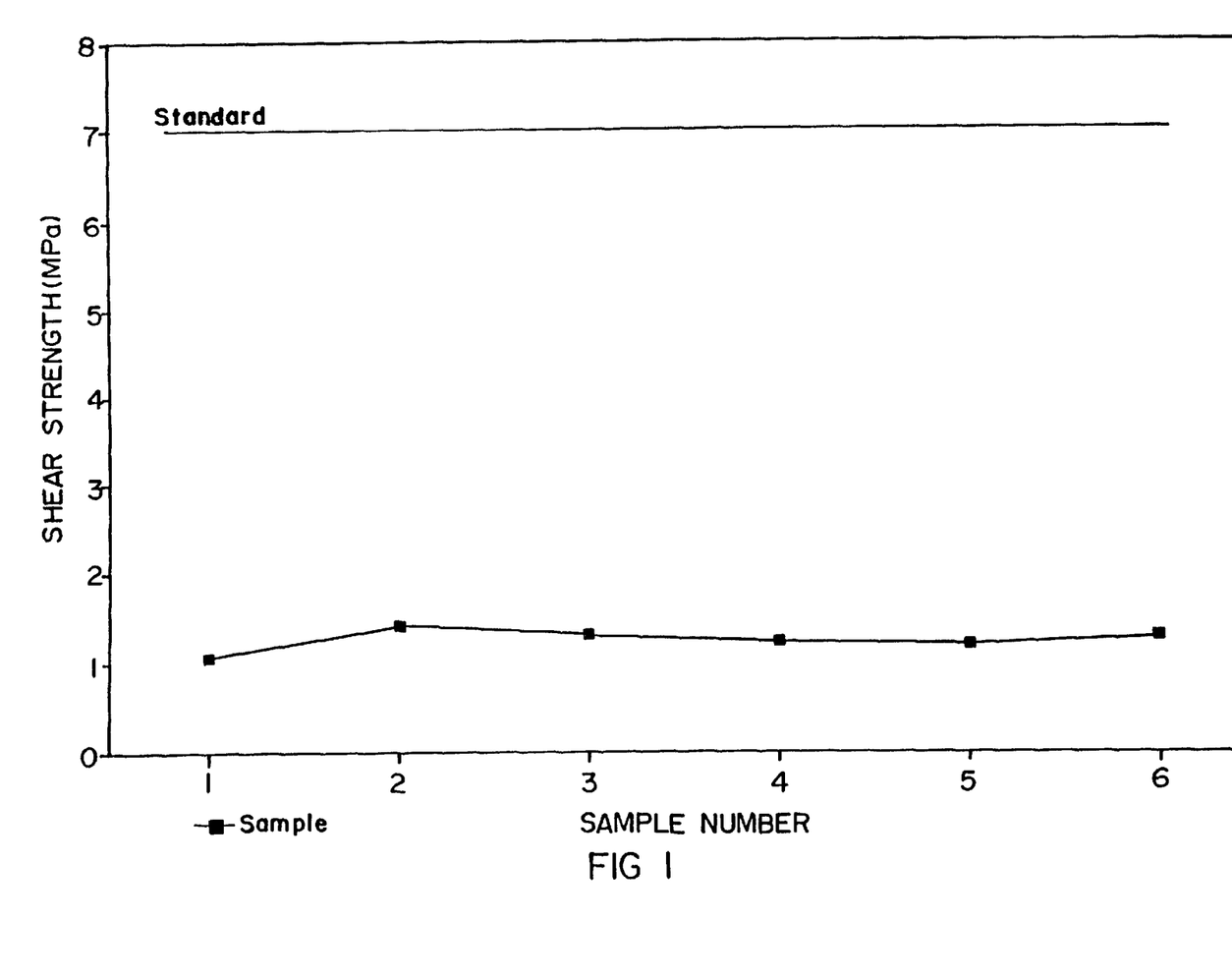
FIG. 1 shows a plot of shear strength (MPa) against sample number for polypropylene pipe samples provided with an exterior lining of mid steel, with reference to the required shear strength according to British Standard B.S.6464.

At 15 mm length of the PP was machined out of each end of each 60 mm length for the purposes of push out tests conducted in accordance with B.S.6464. The push out tests involved the remaining length of the PP pipe of the test pieces being pushed out of the metal cladding and measuring the force required to do so. The shear strength or "push-out" strength was then calculated as follows:

$$\text{Shear strength (MPa)} = \frac{F}{d \cdot \pi \cdot h}$$

where F=maximum force required to shear the PP pipe from the steel pipe cladding [N]

d=PP pipe outer diameter (mm)

h=remaining encapsulated inner plastics liner length (mm) The push out test results are summarised in Table 2 below. The supporting strength profile of the steel clad PP pipe samples is shown in the accompanying figure. The figure shows for comparison the required shear strength according to the British Standard B.S. 6464. Table 3 shows the average shear forces, taking all the test results, as well as the average when disregarding the highest and lowest values. The standard deviation and variance is also shown and then finally, whether or not the shear strength of the pipe samples matches or exceeds that specified by B.S. 6464. From Table 3, it can be seen that the pipe samples though not complying to B.S. 6464, fared well.

TABLE 2

| | Steel/PP | | | |
|---|---|---|---|---|
| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
| 1 | 30 | 111 | 10.98 | 1.05 |
| 2 | 30 | 110 | 14.56 | 1.4 |
| 3 | 30 | 110 | 14.21 | 1.3 |
| 4 | 30 | 110 | 12.93 | 1.2 |
| 5 | 30 | 110 | 12.22 | 1.17 |
| 6 | 30 | 110 | 13.07 | 1.26 |

TABLE 3

| SHEAR STRENGTH (MPa) | |
|---|---|
| Average | 1.23 |
| Average 1 | 1.23 |
| Std devn | 0.11 |
| Variance | 0.01 |
| Acceptable | NO |

Average 1 Highest and lowest not included.

Two methods were employed to evaluate adhesion strength, namely a T-peel test and a Lap shear test (ASTM test method)

T-Peel Test (ASTM D 1876-92)

Polymer strips (300 mm width×26 mm length and 2 mm thickness) were glued along~22 cm of the length thereof. After curing the joints were evaluated using an Instron 4465 tensometer with a 5000N load cell and a crosshead speed of 200 mm/min. The peel strength was obtained from the average peel force over the central 20 cm of peel.

Lap Shear Test (ASTM D 1002-72)

Polymer strips 26mm width×50mm length) were mounted onto roughened mild steel platforms with Pro-Struct 30/71. The strips were masked with masking tape leaving 10 mm available for testing. The physical overlap dimensions were 26 mm width×1 mm length. This procedure was used to eliminate any peer forces. The adhesion strength was evaluated using an Instron 4465 tensometer with a 5000N load cell and a crosshead speed of 5 mm/min.

MATERIALS USED

The materials used was PE 300 HDPE in the form of tiles. PE300 is a GM 5010 based High Density Polyethylene (HDPE) which was obtained from Maizey Plastics, Pretoria, South Africa.

EXAMPLE 5

OXYFLUORINATION COMPARED WITH FLUORINATION

The following experimental conditions were employed:

Material: Black HDPE (PE 300)

Degreasing Agent Prior to Activation: TCE

Surface Area Activated: 0.0312 m$^2$

Gas Mixture:

a) 10 kPa air, 40 kPa $F_2/N_2$ mixture comprising 11.6% by volume $F_2$ 40 kPa $F_2/N_2$ mixture comprising 11.6% by volume $F_2$ Oxyfluorination Time and Temperature:

a) 30 min at 50° C.

b) 3 hrs at 50° C.

Hydrolysis technique: Exposure to moisture in air for 1 week

Test Method: Lap Shear

Dimensions: length: 26 mm, width: 10 mm, glue-line thickness: 0.16 mm

Resin: Pro-Struct 30/71

The results of the lap shear tests conducted are set out in Table 4 below

TABLE 4

Results of the tests conducted on black PE 300 with oxyfluorination and fluorination

| | Lap Shear Strength (MPa) | |
|---|---|---|
| Sample Number | Oxyfluorination | Fluorination |
| 1 | 11.00 | 1.786 |
| 2 | 15.120 | 1.392 |
| 3 | 9.788 | 1.464 |
| 4 | Poor Glue-line | Poor Glue-line |
| 5 | — | — |
| Average | 11.97 | 1.547 |

As can be seen in Table 4, oxyfluorination has better adhesive properties than fluorination on PE 300 with Pro-struct 30/71.

DEGREASING PRIOR TO ACTIVATION

Various contaminants that can influence activation as well as the adhesion process may be present on the surface. It is desirable to clean the surface thoroughly prior to activation. Sample surfaces were degreased by wiping each surface with a tissue properly wetted with a degreasing agent.

EXAMPLE 6: CHOICE OF DEGREASING AGENT

The following experimental conditions were employed:
Material: Black HDPE (PE 300)
Degreasing Agents Prior to Activation:
a) Trichloro-ethylene (TCE),
b) Methyl Ethyl Ketone (MEK),
c) Ethanol (EtOH),
d) Handy Andy (H/A) available from Lever Industrial (Proprietary) Limited
Drying Time Prior to Activation: 24 hrs
Surface Area Activated: 0.1248 m$^2$
Gas Mixture: 10 kPa air, 40 kPaF$_2$/N$_2$ mixture comprising 15 by volume F$_2$
Oxyfluorination Time and Temperature: 30 min at 50° C.
Hydrolysis technique: Immersion in water at room temperature for 18 hrs
Drying Time Prior to Adhesion: 1 week
Test Method: T-Peel
Dimensions: length: 300 mm, width: 26 mm, thickness: 2 mm
Resin: Pro-struct 30/71
The results of the peel tests conducted are set out in Table 5 below.

TABLE 5

Peel test results obtained for PE 300 with Pro-Struct 30/71 with various degreasing agents prior to oxy-fluorination

| Sample | Peel Strength (N/mm) | | | |
|---|---|---|---|---|
| Number | TCE | MEK | Ethanol | Handy Andy |
| 1 | 5.109 | 4.310 | 3.246 | 3.750 |
| 2 | 4.704 | 3.210 | 3.738 | 4.066 |
| Average | 4.906 | 3.760 | 3.492 | 3.908 |

Degreasing with TCE prior to oxy-fluorination gave the best results. The four particular degreasing agents were chosen as they cover a broad spectrum of chemical groups i.e. an alcohol, a ketone and a soap.

EXAMPLE 7: DRYING TIME PRIOR TO OXYFLUORINATION

The following experimental conditions were employed:
Material: Black HDPE (PE 300)
Degreasing Agents Prior to Activation: TCE
Drying Time Prior to Activation:
a) ~3 months
b) 24 hrs
Surface Area Activated: 0.156 m$^2$
Gas Mixture: 10 kPa air, 40 kPa F$_2$/N$_2$ mixture comprising 15.8% by volume F$_2$
Oxyfluorination Time and Temperature: 30 min at 50° C.
Hydrolysis technique: Immersion in water at room temperature for 18 hrs
Drying Time Prior to Adhesion: 72 hrs
Test Method: T-Peel
Dimensions: length: 300 mm; width: 26 mm, thickness: 2 mm
Resin: Pro-Struct 30/71
The result of the peel tests conducted are set out in Table 6 below.

TABLE 6

Peel test results obtained for PE 300 with Pro-Struct 30/71 with a long drying time prior to oxy-fluorination

| | Peel Strength (N/mm) | |
|---|---|---|
| Sample Number | 3 Months | 24 hrs |
| 1 | 0.8335 | 5.109 |
| 2 | 1.608 | 4.704 |
| 3 | 1.007 | — |
| 4 | 2.887 | — |
| 5 | 1.229 | — |
| Average | 1.513 | 4.906 |

Table 6 shows that a long drying time prior to activation (after degreasing) caused reduced peel strengths. It is believed that adverse effects arising form additive migration from the bulk of the polymer to the surface are reduced by the degreasing step, the degreasing step thus resulting in more effective oxyfluorination. Without the degreasing, additive on the surface can be fluorinated or oxyfluorinated, instead of the bulk polymer, and this is undesirable.

EXAMPLE 8: CHOICE OF OXYFLUORINATION METHOD

The following expermimental conditions were employed:
Material: Black HDPE (PE 300)
Degreasing Agent Prior to Activation: MEK
Drying Time Prior to Activation: 24 hrs
Surface Area Activated: 0.0624 m$^2$
Gas Mixture:
a) F$_2$/O$_2$:–57 kPa of a F$_2$/O$_2$ mixture comprising 10% by volume F$_2$
b) F$_2$/N$_2$+Air:–50 kPa air, 7 kPa F$_2$/N$_2$ mixture comprising 15.8% by volume F$_2$, the total mixture of air, F$_2$ and N$_2$ comprising 10% by volume F$_2$
c) 10–40:–10 kPa air, 40 kPa F$_2$/N$_2$ mixture comprising 15.8% by volume F$_2$
Oxyfluorination Time and Temperature: 30 min at 50° C.
Hydrolysis technique: Immersion in 0.48N solution of Hydrochloric Acid (HCl) for 18 hrs
Drying Time Prior to Adhesion: 24 hrs after rinsing with distilled water Test Method: T-Peel Dimensions: length: 300 mm; width: 26 mm, thickness: 2 mm Resin: Pro-Struct 30/71

The results of the peel test conducted are set out in Table 7 below.

TABLE 7

Peel test results obtained for PE 300 with Pro-Struct 30/71 with various oxyfluorination methods

| Oxyfluorination Method | Peel strength (N/mm) | | |
|---|---|---|---|
| | 1 | 2 | Average |
| a) $F_2/O_2$ | 2.192 | 1.665 | 1.929 |
| b) $F_2/N_2$ + Air | 1.543 | 0.9083 | 1.226 |
| c) 10–40 | 4.363 | 2.954 | 3.658 |

The 10–40 condition yielded the best peel strengths when combined with the degreasing, hydrolysis and drying steps described in Example 8.

EXAMPLE 9: ACTIVATION TIME

The following experimental conditions were employed:

EXAMPLE 9A: ACTIVATION TIME STUDY USING $F_2/O_2$

Material: Black HDPE (PE 300)

Degreasing Agent Prior to Activation: TCE

Surface Area Activated: 0.156 m²

Gas Mixture: 50.9 kPa $F_2/O_2$ mixture comprising 10% by volume $F_2$

Oxyfluorination Time and Temperature: 2 min, 10 min, 20 min and 30 min at 50° C.

Hydrolysis technique: Immersion in water at 50° C. for 18 hrs

Drying Time Prior to Adhesion: 1 hr at 50° C. followed by 24 hrs at room temperature Test Method: T-Peel Dimensions: length: 300 mm; width: 26 mm, thickness: 2 mm Resin: Pro-Struct 30/71

The results of the peel test conducted are set out in Table 8 below:

TABLE 8

Peel strengths obtained for PE 300 with Pro-Struct 30/71 with various oxyfluorination times

| Sample Number | Peel Strength (N/mm) | | | |
|---|---|---|---|---|
| | 2 min | 10 min | 20 min | 30 min |
| 1 | 3.7909 | 6.904 | 8.7309 | 6.268 |
| 2 | 1.553 | 6.123 | 7.311 | 7.5597 |
| 3 | 5.413 | 5.393 | 7.2613 | 8.235 |
| 4 | 2.951 | 8.461 | 7.3083 | 9.2347 |
| 5 | — | 6.8838 | — | — |
| Average | 3.4063 | 6.75296 | 7.6526 | 7.8248 |

Figure 2:
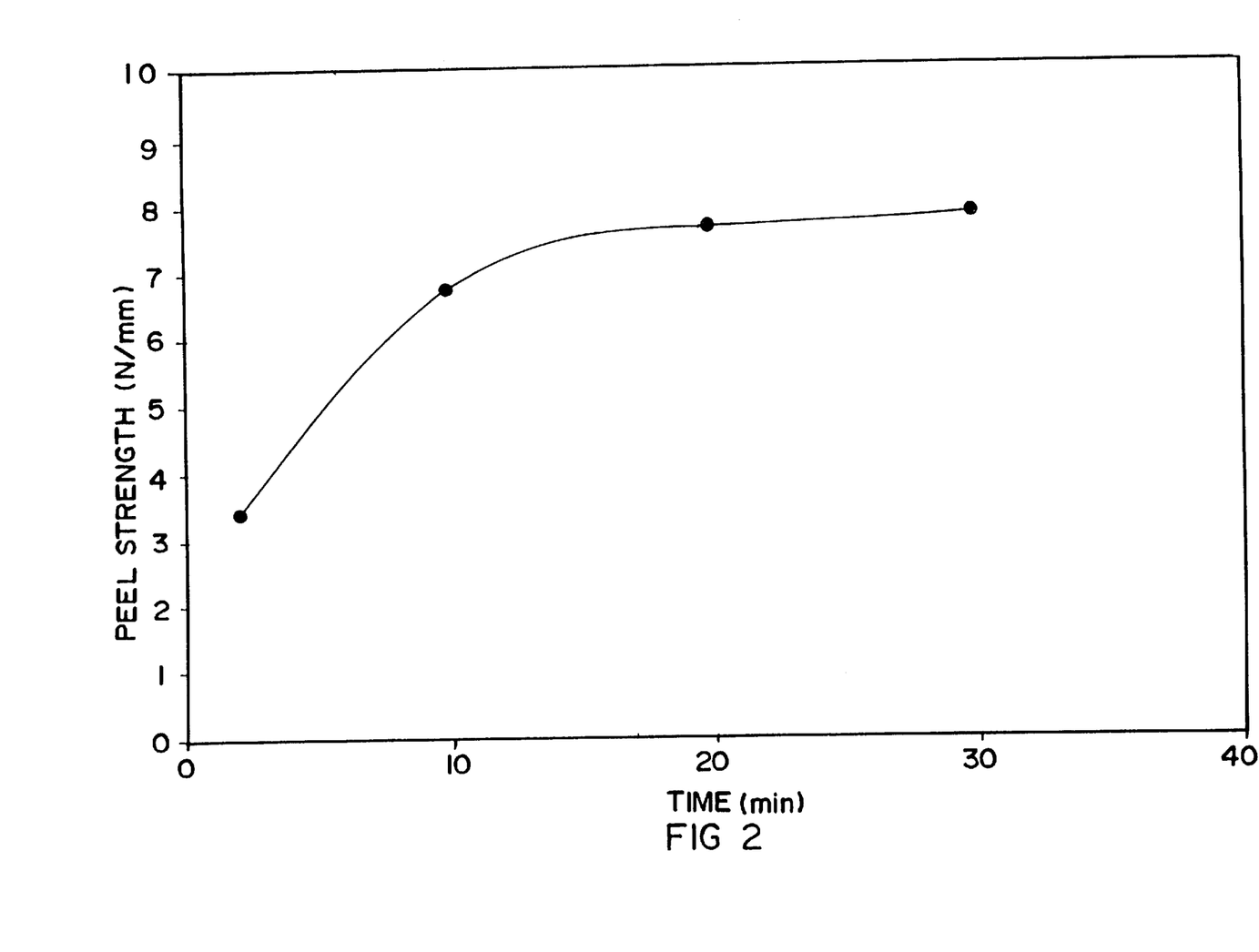
FIG. 2 shows a plot of peel strength against time for Pro-Struct 30/71 with hydrolysis in water.

The data in Table 8 are illustrated FIG. 2.

As can be seen in FIG. 2. the peel strength reaches a plateau after about 15 min of oxyfluorination. It appear that 20–30 min is the preferred oxyfluorination time for PE 300 with Pro-Struct 30/71 under these hydrolysis conditions.

EXAMPLE 9B: REACTION TIME STUDY USING THE 10–40 OXYFLUORINATION METHOD

Material: Black HDPE (PE 300)

Degreasing Agent Prior to Activation: TCE

Drying Time Prior to Activation: 24 hrs

Surface Area Activated: 0.0624 m²

Gas Mixture: 10 kPa air, 40 kPa $F_2/N_2$ mixture comprising 15.8% by volume $F_2$ Oxyfluorination Time and Temperature: 1 min, 15 min and 30 min at 50° C.

Hydrolysis technique: Immersion in water at room temperature for 18 hrs

Drying Time Prior to Adhesion: 1 week

Test Method: T-Peel

Dimensions: length: 300 mm; width: 26 mm, thickness: 2 mm

Resin: Pro-Struct 30/71

The results of the peel test conducted are set out in Table 9 below:

TABLE 9

Peel test results of PE 300 with Pro-Struct 30/71 with various oxyfluorination times

| Sample Number | Peel Strength (N/mm) | | |
|---|---|---|---|
| | 1 min | 15 min | 30 min |
| 1 | 1.457 | 4.385 | 5.109 |
| 2 | 0.9284 | 4.847 | 4.704 |
| Average | 1.1920 | 4.616 | 4.906 |

Table 9 shows that the longer the oxyfluorination time, the better the adhesion with Pro-Struct 30/71. There is however a cut off time where adhesion decreases due to the formation of a weak boundary layer within the polymer. In such cases, a thin layer of the polymer breaks from the bulk. It appears that it is not the adhesive-polymer interface that falls. This phenomenon is illustrated in Example 9C below.

EXAMPLE 9C: EXCESSIVE REACTION TIME INVESTIGATION

Material: Black HDPE (PE 300)

Degreasing Agent Prior to Activation: TCE

Drying Time Prior to Activation: 1 month

Surface Area Activated: 0.156 m²

Gas Mixture: 50.9 kPa $F_2/O_2$ mixture comprising 10% by volume $F_2$

Oxyfluorination Time and Temperature: 25 hrs at 50° C.

Hydrolysis technique: Immersion in water at 50° C. for 18 hrs

Drying Time Prior to Adhesion: 24 hrs

Test Method: T-Peel

Dimensions: length: 300 mm; width: 26 mm, thickness: 2 mm

Resin: Pro-Struct 30/71

The results of the peel test conducted are set out in Table 10 below:

TABLE 10

Peel strengths obtained on over activated PE 300

| Sample Number | Peel Strength (N/mm) |
|---|---|
| 1 | 0.5715 |
| 2 | 1.3860 |
| 4 | — |
| 5 | — |
| Average | 0.9788 |

As can be seen in Table 10, peel strength decreased when the surface was over-activated. The resin within the joints was black after peeling, indicating a weak boundary layer. Only two values are shown since the other three samples gave no peel measurements.

EXAMPLE 10: SUBSTRATE AND SURFACE AREA ACTIVATED

The following experimental conditions were employed:

EXAMPLE 10A: ADHESION TESTS

Material: Black HDPE (PE 300)
Degreasing Agent Prior to Activation: TCE
Surface Area Activated: 0.0936 $m^2$ and 0.156 $m^2$
Gas Mixture: 10 kPa air, 40 kPa $F_2/N_2$ mixture comprising 11.6 % by volume by volume $F_2$
Oxyfluorination Time and Temperature: 30 min at 50° C.
Hydrolysis technique: Exposure to moisture in air for 1 week
Test Method: T-Peel
Dimensions: length: 300 mm; width: 26 mm, thickness: 2 mm
Resin: Pro-Struct 30/71

The results of the peel test conducted on natural and black PE 300 are set out in Table 11 below.

TABLE 11

Results of the peel tests on black and natural PE 300 for different activated surface areas

| Sample Number | 0.0936$m^2$ Peel Strength (N/mm) | | 0.156$m^2$ Peel Strength (N/mm) | |
|---|---|---|---|---|
| | Black | Natural | Black | Natural |
| 1 | 3.74 | 2.808 | 2.224 | 1.941 |
| 2 | 4.422 | 4.104 | 2.837 | 1.828 |
| 3 | 2.541 | 3.665 | 2.519 | 2.195 |
| 4 | — | — | 2.604 | Poor Glue-line |
| 5 | — | — | — | 2.195 |
| Average | 3.568 | 3.525 | 2.546 | 2.039 |

From Table 11 it can be seen that black PE 300 gives slightly higher peel strengths than natural PE 300. Higher peel strengths were obtained as the activated surface area decreased. This was expected for fluorination reactions since the same amount of fluorine was used irrespective of the area treated which reduced activation on larger treated surface areas. With oxyfluorination this was not expected since the reaction did not proceed to completion within 30 min as oxyfluorination reactions are usually very slow (and appear to be inhibited by the presence of oxygen)

EXAMPLE 10B: KINETICS STUDY

Material: Black and Natural HDPE (PE 300)
Gas Mixture: $F_2/O_2$ comprising 10% by volume $F_2$
Dimensions: length: 5 mm, width: 5 mm, thickness: 2 mm (0.9$cm^2$)
Change of mass was monitored using a Perkin Elmer TG2 for a period of 1 hr 10 min (70 min). The sampling frequency was 0.2 Hz under isothermal conditions at 50° C.

Figure 3:
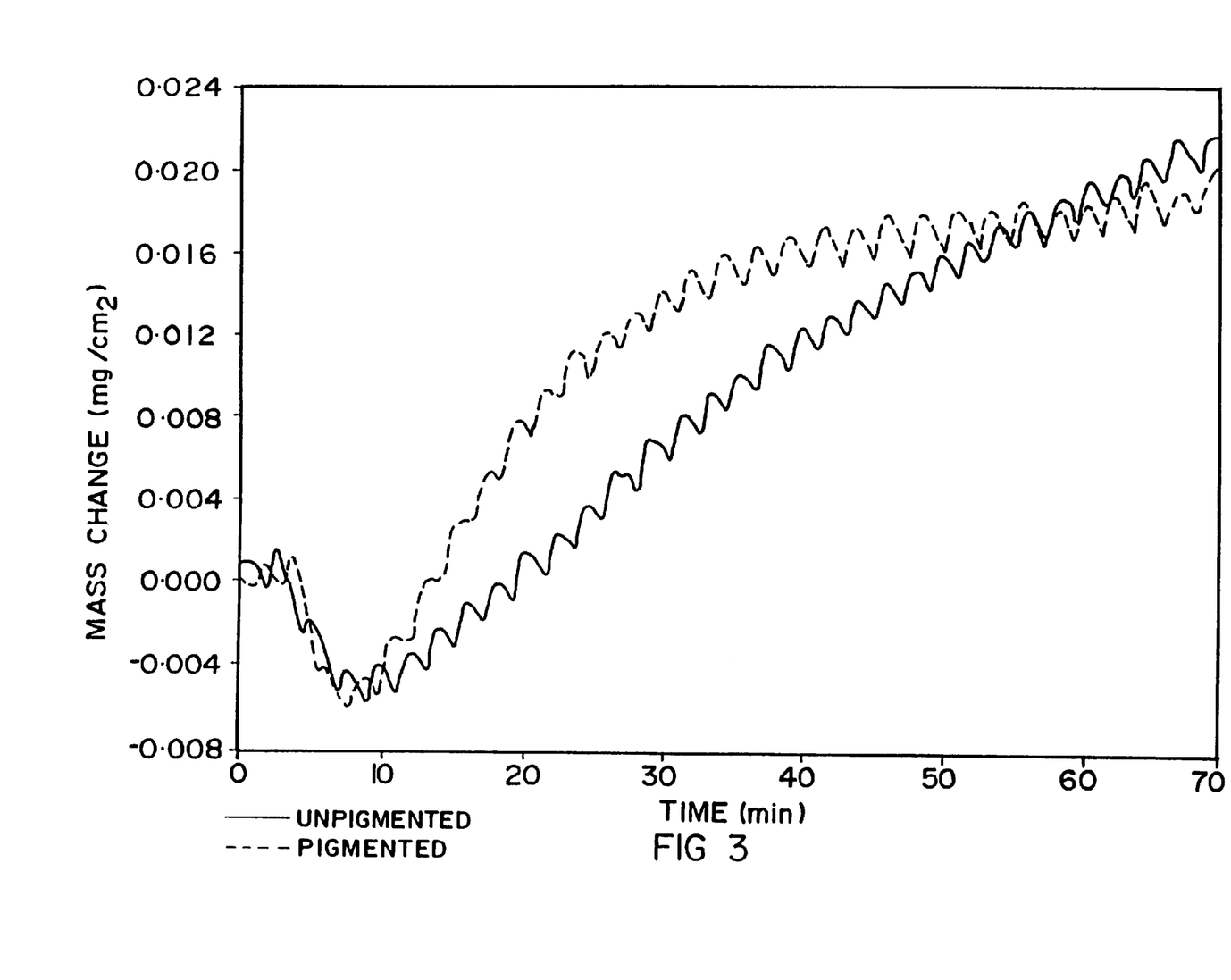
FIG. 3 shows a plot of mass change against time for activation of HDPE with a $F_2/O_2$ mixture comprising 10% by volume $F_2$.

The results of the kinetic studies on black and natural PE 300 are set out in FIG. 3.

As can be seen in FIG. 3, black PE 300 oxyfluorinates faster than natural PE 300 for times under 60 min. At 60 min, both substrate surfaces reacted at the same rate. Natural PE 300 reacted faster at times longer than 60 min than black PE 300 did. The mass changes were 0.02 mg/$cm^2$ and 0.013 mg/$cm^2$ for black and natural PE 300 respectively at typical oxy-fluorination times used in adhesion studies, eg 30 min. It is believed that the reason why natural PE 300 has lower adhesion properties than black PE 300 (Table 8) is that natural PE 300 oxyfluorination far slower at times of 30 min and therefore has a lower degree of activation.

HYDROLYSIS OF ACTIVATED POLYMER SURFACE

On oxyfluorination of HDPE carboxylic acid, acyl fluoride and fluorocarbon groups are formed on the surface. During hydrolysis the acyl fluoride groups are converted into carboxylic acid groups which It is believed act as a curing agent for epoxy resins, ie a chemical bond is actually formed between the HDPE and the epoxy resin.

EXAMPLE 11: CHOICE OF HYDROLYSIS MEDIUM

EXAMPLE 11A: HYDROLYSIS MEDIUM STUDY ON HDPE ACTIVATED USING $F_2/O_2$

Material: Black HDPE (PE 300)
Degreasing Agent Prior to Activation: TCE
Surface Area Activated: 0.156 $m^2$
Gas Mixture: 50.9 kPa $F_2/O_2$ mixture comprising 10% by volume $F_2$
Oxyfluorination Time and Temperature: 30 min at 50° C.
Hydrolysis technique:
a) No hydrolysis
b) Immersion in 0.1M Sodium Hydroxide (NaOH) at 50° C. for 5 min
c) Immersion in water at 50° C. for 18 hrs.
Drying Time Prior to Hydrolysis: 1 hrs at 50° C. followed by 24 hrs at room temperature
Test Method: T-Peel
Dimensions: length: 300 mm; width: 26 mm, thickness: 2 mm
Resin: Pro-Struct 30/71

The results of the peel test conducted are set out in Table 12 below:

TABLE 12

Peel strengths obtained on PE 300 with Pro-Struct 30/71 using different hydrolysis mediums

| Sample Number | Peel Strength (N/mm) | | |
|---|---|---|---|
| | No Hydrolysis | NaOH | Hot Water |
| 1 | 0.6959 | — | 6.268 |
| 2 | 0.7800 | — | 7.5599 |
| 3 | 1.346 | — | 8.235 |

TABLE 12-continued

Peel strengths obtained on PE 300 with Pro-Struct 30/71 using different hydrolysis mediums

| Sample Number | Peel Strength (N/mm) | | |
|---|---|---|---|
| | No Hydrolysis | NaOH | Hot Water |
| 4 | 1.704 | — | 9.2347 |
| 5 | — | — | — |
| Average | 1.131 | — | 7.848 |

From the results in Table 12, it appears that a hydrolysis step is necessary and that the correct choice of hydrolysis medium is very important. It can be concluded from the above results that acyl fluoride groups on the polymer surface do not enhance the adhesion but actually decrease the adhesion properties with Pro-struct 30/71.

No values for the samples hydrolysed in NaOH could be measured thus indicating that the NaOH treatment weakened the bond dramatically. With the NaOH treatment, hydrolysis did initially occur but due to a large excess of base in the system, deprotonation of the carboxylic acid group followed yielding an ionic salt on the surface.

EXAMPLE 11B: HYDROLYSIS MEDIUM STUDY ON HDPE ACTIVATED USING THE 10–40 OXYFLUORINATION METHOD

Material: Black HDPE (PE 300)
Degreasing Agent Prior to Activation: TCE
Drying Time Prior to Activation: 24 hrs
Surface Area Activated: 0.156 m$^2$
Gas Mixture: 10 kPa air, 40 kPa $F_2/O_2$ mixture comprising 11.6% by volume $F_2$
Oxyfluorination Time and Temperature: 30 min at 50° C.
Hydrolysis technique:
a) Exposure to moisture in air for 1 week
b) Immersion in 0.48N HCl for 18 hrs
Drying Time after Hydrolysis: 24 hrs
Test Method: T-Peel
Dimensions: length: 300 mm; width: 26 mm, thickness: 2 mm
Resin: Pro-Struct 30/71

The results of the peel test conducted are set out in Table 13 below:

TABLE 13

Peel strengths obtained on PE 300 with Pro-Struct 30/71 using different hydrolysis media

| Sample Number | Peel Strength (N/mm) | |
|---|---|---|
| | Air | HCl |
| 1 | 2.224 | 4.67 |
| 2 | 2.837 | 2.674 |
| 3 | 2.519 | 2.5420 |
| 4 | 2.604 | 3.584 |
| 5 | — | 3.047 |
| Average | 2.546 | 3.299 |

Similar increases in peel strength as for the HCl hydrolysis had been previously witnessed with water. It appeared to be better to hydrolyse the surface with a wet process that with air for adhesion with Pro-Struct 30/71. Water gave the best results.

EXAMPLE 12: DRYING TIME AFTER HYDROLYSIS

Material: Black HDPE (PE 300)
Degreasing Agent Prior to Activation: TCE
Drying Time Prior to Activation: 24 hrs
Surface Area Activated: 0.156 m$^2$
Gas Mixture: 50.9 kPa $F_2/O_2$ mixture comprising 10% by volume $F_2$
Oxyfluorination Time and Temperature: 30 min at 50° C.
Hydrolysis technique: Immersion in water at 50° C. for 18 hrs
Drying Time after Hydrolysis: 1 hr
Test Method: T-Peel
Dimensions: length: 300 mm; width: 26 mm, thickness: 2 mm
Resin: Pro-Struct 30/71

The results of the peel test conducted are set out in Table 14 below:

TABLE 14

Peel strengths obtained on PE 300 with Pro-Struct 30/71 after a drying time of 1 hr

| Sample Number | Peel Strength (N/mm) |
|---|---|
| 1 | 0.8950 |
| 2 | 1.340 |
| 3 | 2.057 |
| 4 | 1.224 |
| 5 | — |
| Average | 1.379 |

On comparison between the results in Example 11A (peel strengths of 7.8N/mm were obtained on dry samples) it can be seen that it is undesirable to use Pro-Struct 30/71 on a wet substrate. It is important that the polymer is properly dried prior to adhesion.

DEGREASING AFTER ACTIVATION PRIOR TO ADHESION

Once the surface of a polyolefin component has been activated, subsequent handling can contaminate the surface rendering it relatively inactive towards adhesion. A further cleaning step can therefore be an important step to promote the adhesion properties of the activated surface.

During transportation of activated HDPE sheets to a user, the sheets may become contaminated. The contamination may be due to dust as well as fats and oils as a result of handling of the sheets. Since dirt on the surface of the HDPE sheet will interfere with the adhesion it is important to clean the sheet prior to gluing.

EXAMPLE 13

The following experimental conditions were employed:
Material: Black HDPE (PE 300)
Degreasing Agent Prior to Activation: TCE
Drying Time Prior to Activation: 24 hrs
Gas Mixture: 10 kPa air, 40 kPa $F_2/N_2$ mixture comprising 11.6% by volume $F_2$
Oxyfluorination Time and Temperature: 30 min at 50° C.
Hydrolysis technique: Exposure to moisture in air for 1 week
Degreasing Agents Prior to Adhesion:
a) TCE
b) Acetone
c) Ethanol
d) MEK e) Xylene
Drying Time Prior to Adhesion: 3 hrs
Test Method: Lap Sheer
Dimensions: length: 26 mm; width: 10 mm, thickness: 0.16 mm
Resin: Pro-Struct 30/71

The results of the peel test conducted are set out in Table 15 below.

TABLE 15

Lap shear values obtained for PE 300 degreased with various degreasing agents prior to adhesion

| Sample Number | Lap Shear Strength (MPa) | | | | | |
|---|---|---|---|---|---|---|
| | Control | TCE | Acetone | Ethanol | MEK | Xylene |
| 1 | 11.21 | 6.331 | 10.42 | 4.673 | 4.950 | 5.346 |
| 2 | 10.14 | 10.71 | 10.62 | 6.481 | 6.054 | 8.796 |
| 3 | 10.9 | 8.438 | Platform Failure | 5.585 | 6.068 | 4.262 |
| 4 | Poor Glue-line | 8.188 | Platform Failure | 8.669 | 5.012 | 9.385 |
| 5 | Poor Glue-line | Poor Glue-line | Platform Failure | 4.946 | 7.792 | Platform Failure |
| Average | 10.75 | 8.416 | 10.52 | 6.071 | 6.083 | 6.947 |

As can be seen from Table 15, degreasing of the surface prior to gluing made a difference to adhesion strength. Acetone appeared to be the best degreasing agent for this particular system, i.e. black PE 300 and Pro-Struct 30/71, as the shear strength was practically the same as the control samples.

It must be stressed that these results showed only an interaction with the surface and the resin and do not necessarily give similar results when used together with peel tests. However, it can be seen that degreasing prior to adhesion with Pro-Struct 30/71 is not recommended.

It is an advantage of the invention that it provides a method of protecting a cementitious or metal substrate component, eg against corrosion, corrosive or aggressive chemicals or the like, using a polyolefin cladding, which does not involve mechanical securing methods. It is a further advantage that the invention provides a method of strengthening a polyolefin substrate component, using a metal cladding, which similarly does not involve mechanical securing methods.

What is claimed is:

1. A method of producing a composite material the method comprising:
    subjecting a surface of a polyolefin component comprising a polyolefin material to surface activation thereof; and
    adhesively securing together the polyolefin component and a substrate component selected from cementitious components and metal components, at the activated surface of the polyolefin component,
    the activation being by surface oxyfluorination activation by exposing the polyolefin component to an oxyfluorination gas mixture at a pressure of 1–500 kPa and at a temperature above 0° C. and below the melting point of the polyolefin material of the polyolefin component, the activation acting to incorporate fluorine and oxygen into the surface of the polyolefin component and the adhesively securing together of the polyolefin component and the substrate component being effected by means of an adhesive composition, the method including the step, prior to the adhesive securing, of subjecting the activated surface of the polyolefin component to hydrolysis, to form carboxylic acid groups on the surface, which groups contribute to the activation of the surface, and to said adhesion thereof to the substrate.

2. A method as claimed in claim 1, in which oxyfluorinating gas mixture comprises at least 5% by volume of a fluorine-containing gas and at least 5% by volume of oxygen, the gas mixture being at a pressure of at least 5 kPa and at a temperature of at least 20° C.

3. A method as claimed in claim 2, in which the gas mixture comprises 5–20% by volume of the fluorine-containing gas and 5–95% by volume of the oxygen, the gas mixture being at a pressure of 5–150 KPa and at a temperature of 20–100° C.

4. A method as claimed in claim 1 inclusive, in which the surface activation provides the activated polyolefin component surface with a surface tension at 20° C. of at least 40 mN/m, the polyolefin material being selected from polyethylenes, polypropylenes, copolymers of ethylene and propylene and blends of such polyolefins.

5. A method as claimed in claim 1, in which adhesively securing the activated surface of the polyolefin component to the substrate component is effected by means of an adhesive composition comprising a thermosetting resin.

6. A method as claimed in claim 5, in which the material of the substrate component is selected from cement, concrete, cementitious mortar or mild steel, the thermosetting resin being selected from epoxy resins and polyester resins.

7. A composite material, whenever produced in accordance with the method of claim 1.

8. A method as claimed in claim 1, in which the hydrolysis is by contacting the activated surface of the polyolefin component with liquid water for a period of 2–6 hours.

9. A method as claimed in claim 1, in which the surface is subjected to degreasing prior to activation thereof.

10. A method as claimed in claim 1, in which the surface, after activation thereof and prior to the securing, is subjected to degreasing.

11. A method as claimed in claim 1, in which the polyolefin component is secured to the substrate component to form a surface cladding of the substrate component.

12. A method as claimed in claim 1 inclusive, in which the substrate component is secured to the polyolefin component to form a surface cladding of the polyolefin component.

13. A method of producing a composite material, the method comprising:
    subjecting a surface of a polyolefin component comprising a polyolefin material to surface activation thereof; and
    adhesively securing together the polyolefin component and a substrate component selected from cementitious components and metal components, at the activated surface of the polyolefin component,
    the activation being by surface oxyfluorination activation by exposing the polyolefin component to an oxyfluorination gas mixture comprising at least 5% by volume of a fluorine-containing gas and at least 5% by volume of oxygen, at a pressure of 1–500 kPa and at a temperature above 0° C. and below the melting point of the polyolefin material of the polyolefin component, the activation acting to incorporate fluorine and oxygen into the surface of the polyolefin component and the adhesively securing together of the polyolefin component and the substrate component being effected by means of an adhesive composition, the method including the step, prior to said adhesively securing, of subjecting the activated surface of the polyolefin component to hydrolysis and the step, after the hydrolysis and prior to said adhesively securing, of subjecting the activated surface to degreasing, to form carboxylic acid groups on the surface, which groups contribute to the activation of the surface, and to said adhesion thereof to the substrate.

14. A method of producing a composite material, the method comprising:

subjecting a surface of a polyolefin component comprising a polyolefin material to surface activation thereof, and adhesively securing together the polyolefin component and a substrate component selected from cementitious components and metal components, at the activated surface of the polyolefin component, the activation being by surface oxyfluorination activation by exposing the polyolefin component to an oxyfluorination gas mixture at a pressure of 1–500 kPa and at a temperature above 0° C. and below the melting point of the polyolefin material of the polyolefin component, the activation acting to incorporate fluorine and oxygen into the surface of the polyolefin component and the adhesively securing together of the polyolefin component and the substrate component being effected by means of an adhesive composition, the method further including the step, prior to said adhesively securing, of subjecting the activated surface of the polyolefin component to hydrolysis by contacting the activated surface of the polyolefin component with liquid water for a period of 2–6 hours, to form carboxylic acid groups on the surface, which groups contribute to the activation of the surface, and to said adhesion thereof to the substrate.

* * * * *